Patented May 7, 1929.

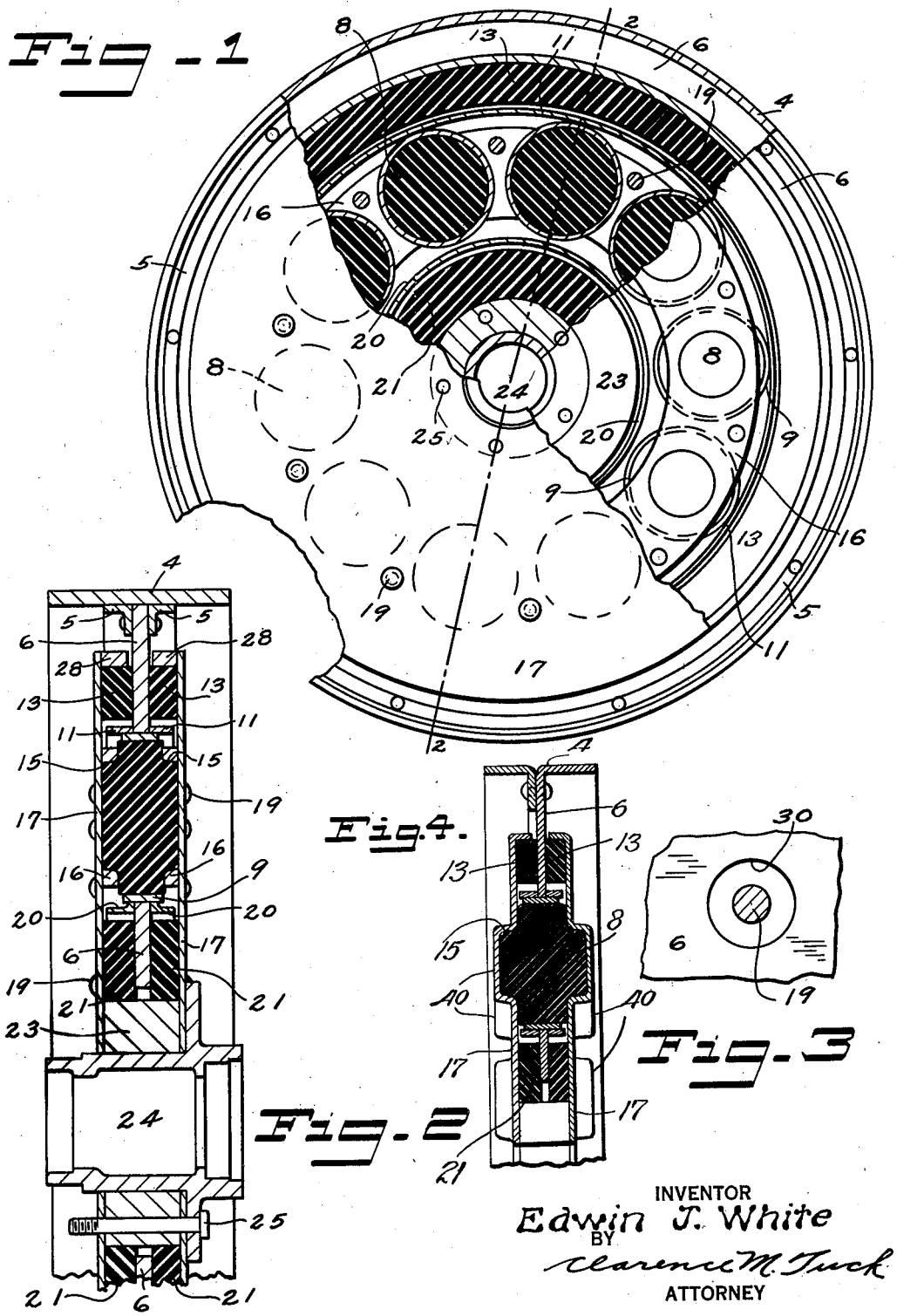

1,711,819

UNITED STATES PATENT OFFICE.

EDWIN J. WHITE, OF SEATTLE, WASHINGTON.

RESILIENT WHEEL.

Application filed February 1, 1928. Serial No. 250,979.

My invention refers to improvements in resilient wheels of a type suitable for motor vehicles, rail cars and rail coaches. My present invention is an improvement on my U. S. Patent # (1,569,106) dated Jan. 12, 1926, and my United States Patent #(1,651,-009) dated Nov. 29, 1927.

The principal object of my invention is to provide a shock absorbing wheel that distributes the shock over a large amount of rubber.

Another object of my invention is to provide a wheel that carries the normal load of the vehicle and its load on a series of discs with additional shock absorbing means nearer the center of the wheel and also shock absorbing means near the outer rim of the said wheel.

Another object is to provide a wheel carrying rubber discs so placed that each disc carries the same amount of the total load and each disc, free from bolts or holes passing therethrough, is adapted to be compressed practically from one edge to the diametrically opposite edge, thus differing from my former cases wherein the compression takes place from the center of the disc to the edge.

A still further object is to provide a wheel of such construction as can be made without the need of expensive die and press work.

I accomplish these objects by devices illustrated in the accompanying drawings wherein:

Figure 1 is the side elevation of a wheel embodying my invention. No tire is shown and certain parts are broken away to better illustrate the construction.

Figure 2 is a fragmentary transverse section along line 2—2 on Figure 1.

Figure 3 is a fragmentary view showing the relief at the holes in the supporting plate.

Figure 4 is a fragmentary transverse section similar to Figure 2 showing a modified form of my wheel.

Referring to the drawings throughout which, like numerals indicate like parts, the numeral 4 designates the rim proper which may be adapted to receive a rubber tire, a flanged tire for track use or any other type of tire desired. Secured to rim 4, by any convenient means as by angles 5 is the central supporting plate 6. Inset in plate 6 is a series of rubber discs 8 each of which is surrounded by a retaining hoop 9 which in turn is secured to plate 6. Completely encircling the series of discs 8 and secured to plate 6 are two hoops 11 adapted to engage the buffers 13. These may be of the form shown in my Patent #(1,651,009) which are made of any suitable material such as rubber.

Engaging the discs 8 through means of the reduced portions 15 are two circular plates 16. These in turn are secured to side plates 17 by rivets or bolts 19. Enlarged holes 30 in plate 6, as shown in Figure 3, allow the plate to move without touching bolts 19.

It will be apparent that plates 16 could be dispensed with and recesses 40 pressed in side plates 17 to serve the same purpose.

Disposed within the circle of discs 8 are rings 20 secured to plate 6 and adapted to engage the inner buffers 21 which I prefer to make of rubber. An annular filler 23 spaces the side plates 17 adjacent the hub 24. Bolts 25 are used to secure the wheel between the flange of hub 24 and the hub cap which has been removed from Figure 2. Rings 28 encircling the side plates 17 serve to retain the buffers 13.

In operation the weight of the vehicle is taken from the axle by hub 24 which in turn transfers it through sideplates 17 and circular plates 16 to the opposite ends of discs 8. The opposing action is supplied by the rim 4. This rim through its associated fixed parts, plate 6 and hoops 9, tends to move in the opposite direction to hub 24 thus distorting the discs 8. The size, number and composition of these rubber discs 8 is proportioned so as to carry the normal load in the weight of the vehicle and the load thereon. It is well known, however, that all load carrying vehicles or cars are frequently subjected to several overloads of dead weight, also operating on a sideling road or roadbed will place more weight on one side of the vehicle than on the other; further, road jars, particularly in trucks etc. such as ruts and obstructions place most unusual loads on one wheel momentarily.

To meet these conditions I provide both an inner and an outer shock absorbing means as members 21 and 13 respectively.

In my earlier models I experienced some difficulty because of the friction of the metal surfaces that rubbed together at each deflection of the wheel. In my present case I prevent this by using 2 sets of similar rubber buffers 13 and 21 which support plate 6 against side movement, preventing its touching either the side plates 17 or the parts secured thereto. Buffers 13 also serve to seal the interior of the wheel against the entrance of dirt or water.

Other details of the operation of my invention will be so obvious to those skilled in the art that I believe no further description is necessary.

Manifestly, changes may be made in the form, proportions and arrangement of parts of my invention without departing from the spirit thereof,

What I claim is:—

1. In a resilient wheel of the class described, a rim, a supporting plate, load carrying discs engaged by said plate, side plates adapted to engage said discs, buffing means disposed outside and inside of said discs.

2. In a resilient wheel, a rim, a supporting plate, resilient discs secured in said supporting plate, side plates disposed on each side of said supporting plate, means, secured to said side plates, adapted to engage the projecting sides of said resilient discs and buffing means disposed outside and inside of said discs.

3. In a resilient wheel, a rim, a supporting plate, resilient discs secured in said supporting plate, side plates disposed on each side of said supporting plate, means, secured to said side plates adapted to engage the projecting sides of said resilient discs, buffing means disposed near the periphery of said side plates and adapted to be engaged by the supporting plate and buffing means disposed near the center of said side plates adapted to be engaged by the supporting plate.

4. In a resilient wheel, a tire carrying rim, a supporting plate secured to said rim, a series of rubber discs disposed circularly in said plate, retaining hoops encircling each rubber disc and secured to the supporting plate, side plates adapted to be engaged by a wheel hub and forming the outer casing of the wheel, circular plates engaging the projecting sides of said rubber discs and secured to said side plates, buffing means disposed outside and inside of said rubber discs, means secured to the supporting plate to engage the outer and inner buffing means respectively.

In witness whereof, I hereunto subscribe my name this 26th day of January, A. D. 1928.

EDWIN J. WHITE.